(12) United States Patent
Winkles et al.

(10) Patent No.: US 7,266,614 B1
(45) Date of Patent: Sep. 4, 2007

(54) EMBEDDED CHANNEL ADAPTER HAVING LINK LAYER CONFIGURED FOR CONCURRENT RETRIEVAL OF PAYLOAD DATA DURING PACKET TRANSMISSION

(75) Inventors: Joseph D. Winkles, Austin, TX (US); Joseph A. Bailey, Austin, TX (US); Norman M. Hack, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 706 days.

(21) Appl. No.: 10/259,409

(22) Filed: Sep. 30, 2002

(51) Int. Cl.
*G06F 15/16* (2006.01)
*H04J 3/12* (2006.01)

(52) U.S. Cl. .................. 709/236; 709/250; 709/212; 714/749; 370/389

(58) Field of Classification Search ............. 709/236, 709/208–216, 248, 250; 710/22, 26–28, 710/2, 71; 370/389, 402; 714/749, 12
See application file for complete search history.

(56) References Cited

U.S. PATENT DOCUMENTS

| | | | |
|---|---|---|---|
| 6,594,712 B1 * | 7/2003 | Pettey et al. ................. | 710/22 |
| 6,788,704 B1 * | 9/2004 | Lindsay ..................... | 370/465 |
| 6,789,143 B2 * | 9/2004 | Craddock et al. ............. | 710/54 |
| 6,816,889 B1 * | 11/2004 | Graham ..................... | 709/213 |
| 6,829,663 B1 * | 12/2004 | Ghaffari et al. .............. | 710/71 |
| 7,013,419 B2 * | 3/2006 | Kagan et al. ................ | 714/749 |
| 7,113,507 B2 * | 9/2006 | Shin et al. .................. | 370/389 |

OTHER PUBLICATIONS

Cassiday, InfiniBand™ Architecture Tutorial, Hot Chips, Sun Microsystems, Aug. 2000, 79 pages.

* cited by examiner

*Primary Examiner*—David Wiley
*Assistant Examiner*—Jude Jean-Gilles
(74) *Attorney, Agent, or Firm*—Manelli Denison & Selter PLLC; Leon R. Turkevich

(57) ABSTRACT

An host channel adapter embedded within a processor device includes a transport layer module, a transport layer buffer, a link layer module, and a link layer buffer configured for storing at least two packets to be transmitted by the embedded host channel adapter. The transport layer module is configured for generating, for each packet to be transmitted, a transport layer header, and storing in the transport layer buffer the transport layer header and a corresponding identifier that specifies a stored location of a payload for the transport layer header. The link layer module includes payload fetch logic configured for fetching the payload based on the corresponding identifier, enabling the link layer module to construct one of the two packets to be transmitted concurrently during transmission of the second of the two packets.

9 Claims, 3 Drawing Sheets

EMBEDDED CHANNEL ADAPTER HAVING LINK LAYER CONFIGURED FOR CONCURRENT RETRIEVAL OF PAYLOAD DATA DURING PACKET TRANSMISSION

BACKGROUND OF THE INVENTION

1. Field of the Invention

The present invention relates to a host channel adapter configured for communication with target channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, substantial concerns arise if attempts are made to embed an HCA into a processor core, for example as a processor configured for InfiniBand™ communications. In particular, a stand-alone HCA device may have a prescribed number of external pins for a memory interface configured for accessing external memory. However, adding the HCA memory interface, having the prescribed number of external pins, to a processor core that already has its own memory interface would result in an inefficient implementation having two memory interfaces, resulting in excessive pins, and a substantially higher packaging cost.

An additional concern when embedding an HCA into a processor core is the necessity of a small die size to reduce costs, resulting in a substantially smaller internal memory being available than if the HCA were implemented as a discrete device. However, conventional HCA architectures require substantially more memory for buffering between the Transport Layer and Link Layer transmit path (e.g., 256 kbytes) than typically would be permitted for an embedded HCA in a processor core (e.g., 16 kbytes).

The InfiniBand™ Architecture Specification requires that a packet sent via an HCA undergoes transport layer service, followed by link layer service, based on creation of a work queue entry (WQE) in system memory by an executable verbs consumer resource. Each work queue entry represents one message that needs to be transmitted for the verbs consumer resource. A message can be up to 2 gigabytes (GB) long; hence, a message may need to be broken down into packets that can be transmitted across the InfiniBand™ network. The size of the packet depends on the Maximum Transfer Unit (MTU) for the path to be used for transmitting the packet across the InfiniBand™ network: the MTU sizes may be 256, 512, 1024, 2048, or 4096 bytes. Hence, if an embedded HCA was only allocated 16 kbytes of memory for buffering between the Transport Layer and Link Layer transmit path, the HCA could only store four packets of the largest MTU size (4096).

Examples of operations performed during transport layer service (performed, for example, by a transport layer module) include constructing a transport layer header, generating a packet sequence number, validating service type, etc., based on detecting a work notification of the work queue entry created in the system memory. Examples of operations performed during link layer service (performed, for example, by a link layer module) include service layer and virtual lane mapping (SL-VL mapping), link layer flow control packet generation, link layer transmission credit checking, etc. Note that the transport layer module and the link layer module operate independently and in parallel; hence, the transport layer module attempts to supply the link layer module with packets to transmit, typically by constructing the packets and depositing the packets in an output buffer, while the link layer module continually withdraws packets from the output buffer and transmits them onto the InfiniBand™ network. A particular concern is that the HCA is able to continually transmit packets to keep the link "busy" and avoid gaps on the link (i.e., avoid "dead time" on the link).

Typically the transport layer module would service work queue entries by sequential processing of the respective work notifications, using a first in first out arrangement. However, the link layer operations within the HCA are configured for transmitting InfiniBand™ packets according to virtual lane prioritization. In particular, the InfiniBand™ Architecture Specification defines the virtual lanes as the means to implement multiple logical flows over a single physical link. An HCA may support up to 16 different virtual lanes, where each virtual lane has its own corresponding set of buffer resources, including link level flow control. Link level flow control in an InfiniBand™ network utilizes a token based system, where a link partner (e.g., a channel adapter or a switch) sends flow control tokens to the transmitting channel adapter each time the buffer space is freed in the link partner. If the transmitting channel adapter does not have sufficient flow control tokens to accommodate an entire packet for a given virtual lane, the transmitting channel adapter cannot send any more packets for the virtual lane until more flow control tokens have been received.

Hence, if an embedded HCA allocated a 16 kB output buffer has four stored packets, each of the maximum MTU size (4096 bytes), and the virtual lanes for those packets do not have enough flow control tokens, the link layer module would need to wait until more tokens are received for those virtual lanes before transmitting the data packets. In addition, if one attempted to store at least one 4 kB packet for each of the sixteen (16) supported virtual lanes, the size of the output buffer would expand to 64 kB, instead of the allowed 16 kB.

The problem is further compounded if storage of multiple packets for each virtual lane is preferred in the case where the link layer utilizes a virtual lane high/low priority table. In particular, each entry in the virtual lane high/low priority table specifies the virtual lane that should be serviced next, and the weight of the virtual lane, in terms of how many bytes should be transmitted onto the virtual lane before moving to the next entry in the table. Hence, it may be desirable that the output buffer stores more than one packet for each virtual lane, to enable each virtual lane to utilize the bandwidth allocated according to the virtual lane high/low priority table. Hence, if four packets (each having an MTU size of 4 kB) were allocated to each of the 16 virtual lanes, the resulting output buffer size would be 256 kB, substantially higher than the 16 kB buffer contemplated for the embedded HCA.

SUMMARY OF THE INVENTION

There is a need for an arrangement that enables a host channel adapter to be embedded in a processor core in an efficient and economical manner.

There also is a need for an arrangement that minimizes the number of additional interface pins needed for embedding an HCA into a processor.

There also is a need for arrangement that enables an embedded host channel adapter to be implemented in an efficient and economical manner, without encountering transmission interruptions due to transfer of packet data from system memory.

These and other needs are attained by the present invention, where an embedded host channel adapter includes a transport layer module, a transport layer buffer, a link layer module, and a link layer buffer configured for storing at least two packets to be transmitted by the embedded host channel adapter. The transport layer module is configured for generating, for each packet to be transmitted, a transport layer header, and storing in the transport layer buffer the transport layer header and a corresponding identifier that specifies a stored location of a payload for the transport layer header. The link layer module includes payload fetch logic configured for fetching the payload based on the corresponding identifier, enabling the link layer module to construct one of the two packets to be transmitted concurrently during transmission of the second of the two packets. Hence, memory requirements are minimized by storing in the transport layer buffer the identifier, as opposed to the substantially larger payload. Moreover, the payload fetch logic enables the link layer module to fetch the payload for a new packet during transmission of another packet already stored in the link layer buffer, eliminating the effects of any transfer delays from system memory.

One aspect of the present invention provides a method in a host channel adapter. The method includes storing by a transport layer module an entry in a transport layer buffer that includes a transport layer header and an identifier that specifies a stored location of a payload for the transport layer header. The method also includes generating a transmit packet by a link layer module, including fetching the payload from the corresponding stored location based on reading the corresponding entry from the transport layer buffer, and storing the transmit packet, having the corresponding payload, in a link layer buffer configured for storing at least two transmit packets. The method also includes transmitting by the link layer module a stored transmit packet from the link layer buffer concurrently with the generating of the transmit packet.

Another aspect of the present invention provides an embedded host channel adapter. The embedded host channel adapter includes a transport layer buffer configured for storing a transmit packet entry including a transport layer header and an identifier that specifies a stored location of a payload for the transport layer header. The embedded host channel adapter also includes a transport layer module, a link layer buffer, and a link layer module. The transport layer module is configured for generating the transport layer header and storing the corresponding transmit packet entry in the transport layer buffer in response to a corresponding received work queue entry. The link layer buffer is configured for storing at least two packets to be transmitted by the embedded host channel adapter. The link layer module has payload fetch logic configured for fetching the payload via a processor memory interface based on the corresponding identifier. The link layer module is configured for constructing one of the two packets to be transmitted, concurrently during transmission of the second of the two packets.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
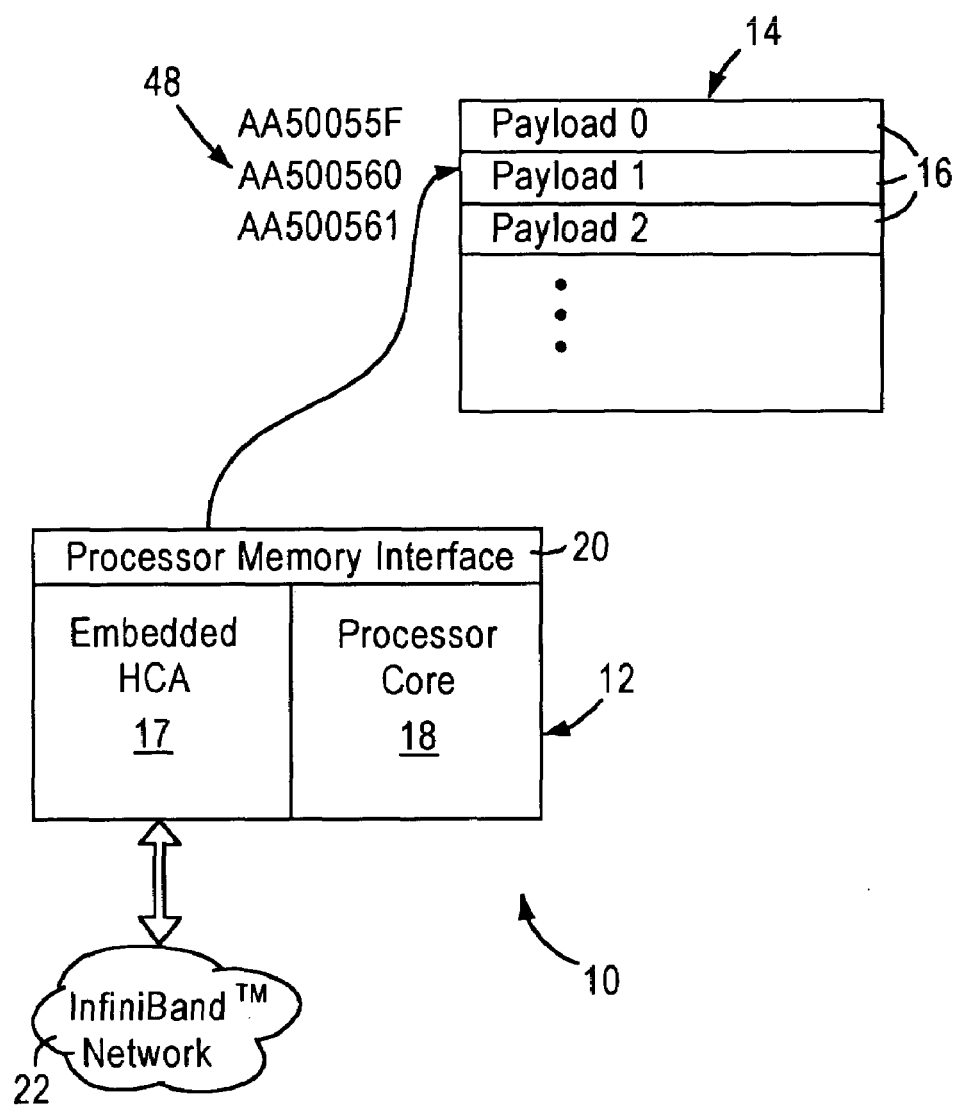
FIG. 1 is a diagram illustrating a processor based system having an embedded host channel adapter, according to an embodiment of the present invention.

FIG. 1 is a block diagram illustrating a processor system 10 having a processor 12 (i.e., processor device) implemented on a single chip, and a system memory 14 configured for storing processor based data (not shown) and payload data 16 to be transmitted by a host channel adapter 17. The processor device 12 includes a processor core 18, for example an Athlon™ based x86 compatible processor core commercially available from Advanced Micro Devices, Sunnyvale, Calif., and an embedded host channel adapter (HCA) 17. Both the processor core 18 and the embedded HCA 17 share a processor memory interface 20, enabling either the processor core 18 or the embedded HCA 17 to access the system memory 14 via the same interface 20.

The embedded HCA 17, compliant with the InfiniBand™ Architecture Specification, is configured for sending and receiving data packets to devices via the InfiniBand™ network 22. As described below, the embedded HCA 17 is configured for retrieving from system memory 14, via the processor memory interface 20, the payload 16 (e.g., "Payload 1") for a given packet to be transmitted, based on reception of a WQE from a verbs consumer resource.

Figure 2:
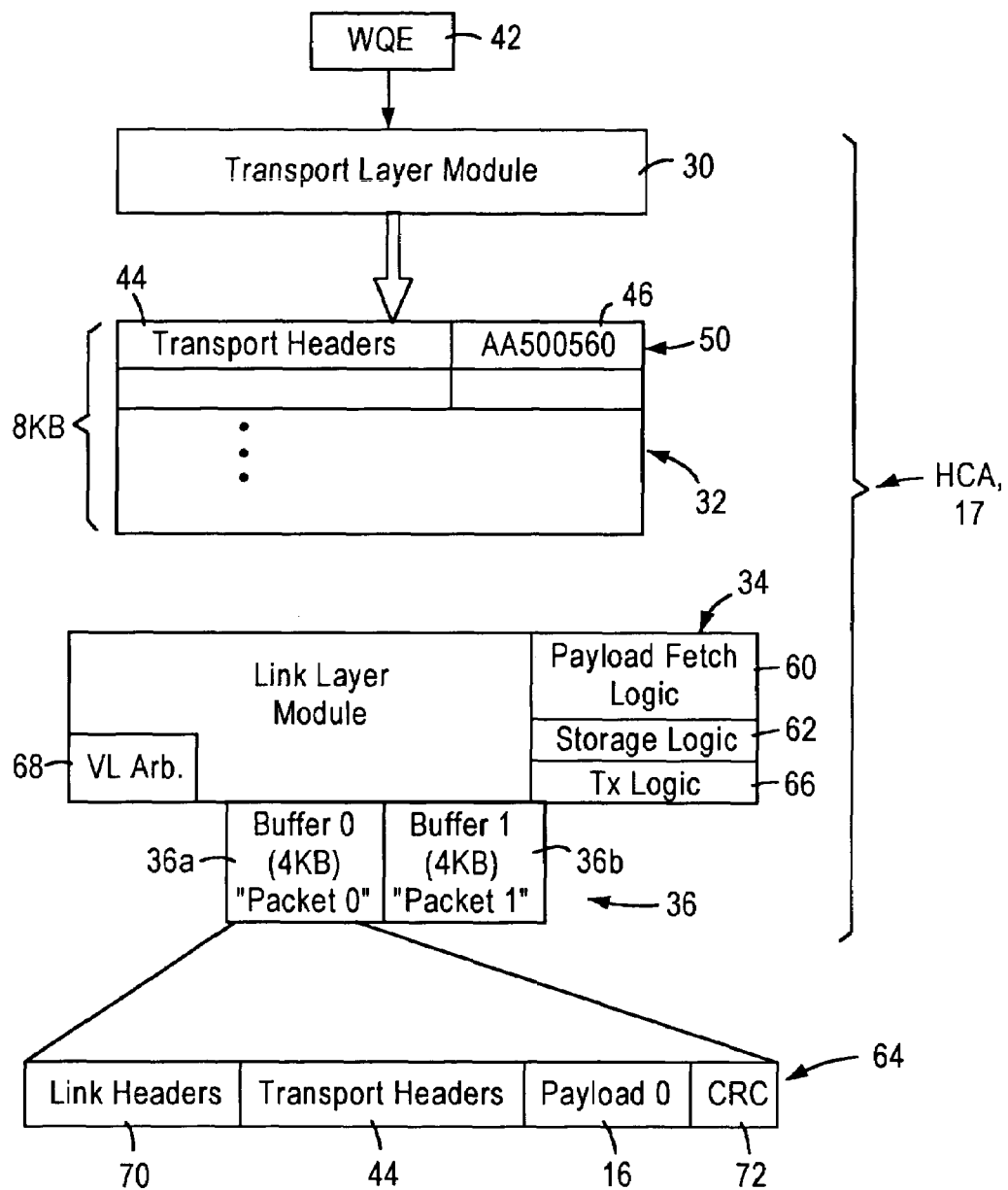
FIG. 2 is a diagram illustrating in detail the host channel adapter of FIG. 1.

FIG. 2 is a diagram illustrating in further detail the embedded HCA 17, according to an embodiment of the present invention. The embedded HCA includes a transport layer module 30, a transport layer buffer 32, a link layer module 34, and a link layer buffer 36. The transport layer buffer 32 is configured for storing multiple transmit packet entries 50, where each transmit packet entry 50 includes transport layer headers 44 and an identifier 46 that specifies a stored location 48 of a payload 16 for the transport layer headers 44. The transport layer module 30 is configured for responding to a received WQE 42 by generating the corresponding transport layer headers 44; typically the WQE 42 will specify the identifier 46, also referred to as a pointer, that specifies the stored location 48 of the payload 16 for the transport layer header 44. As illustrated in FIG. 2, the transport layer module 30 generates the transport headers 44 for the payload 16 (e.g., "Payload 1") stored in system memory 14 at the stored location 48, illustrated in FIG. 1 as having a system memory address value "AA500560" (hexadecimal).

Note that the transport layer module 30 also is configured, in compliance with the InfiniBand™ Architecture Specification, to generate a packet sequence number, validating the service type (e.g., reliable connection, reliable datagram, unreliable connection, unreliable datagram, etc.), and other transport layer operations. In particular, the transport layer module 30 fetches the necessary context information from system memory 14 (e.g., queue pair context information, reliable datagram channel information, translation table information, etc.) each time it services a WQE 42 in order to determine how to build the transport headers 44, as well as calculate the physical addresses 48 for the payloads 16. Once the transport layer operations have been completed, the transport layer module 30 stores the transport headers 44 and the corresponding identifier 46 as an entry 50 in the transport layer buffer 32.

The storage of the identifier 46 with the associated transport headers 44 in the entry 50, in contrast to storing the actual payload 16, substantially reduces the storage requirements for the transport layer buffer 32. Hence, the transport layer buffer 32 may be implemented as an 8 kB buffer since a transmit packet entry 50 can have its size reduced from the MTU size of 4096 bytes down to as little as 40 bytes (note that the maximum size of the transport header 44 will be 122 bytes). Hence, the 8 kB transport layer buffer 32 has the capacity for storing at least 100 entries 50 for respective transport packets, with the potential of holding as many as 400 entries 50, depending on the size of the header field 44 and the size of the pointer 46.

Since each WQE 42 typically will require generation of multiple transmit packets 64, the transport layer module 30 will therefore have sufficient storage capacity in its transport layer buffer 32 to generate and store all the necessary transmit packets 64 for the corresponding WQE 42, without requiring multiple accesses of associated context information from the system memory 14 via the shared memory interface. In particular, the transport layer module 30 can fetch the necessary context information (e.g., queue pair context information, reliable datagram channel information, translation tables, etc.), and generate all the associated transmit packets 64 from the single fetch cycle. In comparison, note that if the payload data was stored in the transport layer buffer (thus limiting the buffer 32 to storing only 1 transmit packet) the transport layer module 30 would be unable to generate all the necessary transport packets for a corresponding WQE 42 using a single fetch cycle, and therefore would require multiple fetch cycles via the processor memory interface 20 to build the next packet 64, reducing the HCA performance by limiting the packet throughput, and limiting access to the shared memory interface 20 by the processor core.

Hence, storage of the identifiers 46 in the transport layer buffer 32 enables the transport layer module 30 to build all the necessary transmit packets 64 for a WQE 42 using a single fetch cycle of context information via the processor memory interface.

The link layer module 34 includes payload fetch logic 60, storage logic 62 for storing a generated transmit packet 64 in the link layer buffer 36, and transmit logic 66 configured for transmitting a stored packet 64 onto the InfiniBand™ network 22. In particular, the payload fetch logic 60 is configured for selecting an entry 50 based on determining which virtual lane should be serviced next as specified by the virtual lane high/low priority table 68. Upon selecting an entry 50 for generation and transmission of the corresponding data packet 64, the payload fetch logic 60 fetches the corresponding payload 16 (e.g., "Payload 1") via the processor memory interface 20 based on the corresponding identifier 46 (e.g., "AA500560").

Upon retrieval of the payload 16, the link layer module 34 performs all necessary link layer operations in generating the data packet 64 according to the InfiniBand™ Architecture Specification, including generating a link header 70 and cyclic redundancy check (CRC) fields 72 (e.g., Invariant CRC (ICRC) and Variant CRC (VCRC)).

The storage logic 62 is configured for storing the generated transmit packet 64 in an unused portion of the link layer buffer 36. As illustrated in FIG. 2, the link layer buffer 36 is partitioned into a first buffer portion 36a and a second buffer portion 36b each having a size of 4 kB for storing the prescribed maximum transfer unit size of 4 kB. The storage logic 62 is configured for utilizing an alternating storage sequence, alternating between the buffer portions 36a and 36b. Hence, the transmit logic 66 can transmit a stored transmit packet 64 (e.g., "Packet 0") from the first buffer portion 36a concurrently with the link layer module 34 fetching the payload 16 (e.g., "Payload 1") for generation of the subsequent packet 64 (e.g., "Packet 1") and storage thereof in the unused, second buffer portion 36b. Hence, the transmit logic 66 is able to continually transmit stored data packets, since the link layer module 34 can fetch the payload data 16 for the next packet in the time it takes to transmit the current packet.

Note that the buffer memory 36 also may be implemented as a wrap-around memory, wherein the link layer module 34 utilizes read/write pointers to identify the start and end locations of the stored packets 64.

Figure 3:
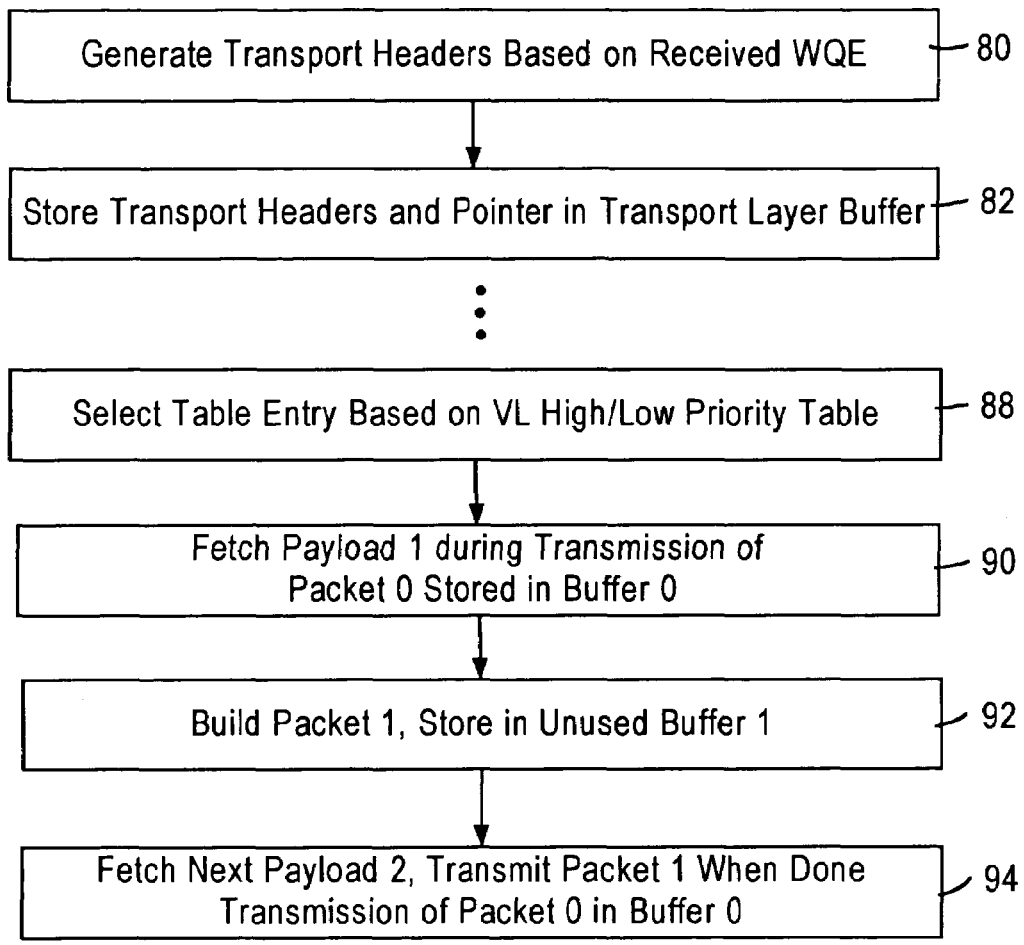
FIG. 3 is a diagram illustrating the method of transmitting packets by the embedded host channel adapter, according to an embodiment of the present invention.

FIG. 3 is a diagram illustrating the method in the embedded host channel adapter 17 of transmitting data packets utilizing link layer transfer of payload data, according to an embodiment of the present invention. The method begins in step 80, where the transport layer module 30 generates transport headers 44 based on a received WQE 42, and stores in step 82 the transport headers 44 and the corresponding pointer 46 as an entry 50 in the transport layer buffer 32.

The link layer module 34, independent of the transport layer module 30, selects in step 88 a table entry 50 based on determining the next virtual lane to be serviced as specified by the virtual lane priority table 68. The payload fetch logic 60 fetches in step 90 the payload 16 (e.g., "Payload 1") at the memory location 48 specified by the corresponding identifier 46 (e.g., "AA500560"), concurrently during the transmission of the previously generated transmit packet 64 ("Payload 0") stored in the buffer portion 36a. Upon retrieval of the payload 16 (e.g., "Payload 1"), the link layer module 34 builds in step 92 the packet 64 ("Packet 1") by adding the corresponding payload 16, link header 70, and CRC fields 72 to the transport headers 44, and utilizes the storage logic 62 to store the generated packet 64 ("Packet 1") in the unused buffer portion 36b.

The link layer module 34 repeats the process in step 94 by fetching the next payload 16 ("e.g., "Payload 2") according to the VL arbitration table 68 and as specified by the corresponding entry 50, and transmitting the stored packet ("Packet 1") from the buffer portion 36b upon completion of transmission of the prior packet ("Packet 0").

According to the disclosed embodiment, the concurrent fetching of the next payload during the transmission of the previously generated transmit packet enables the link layer to fetch the payload without any transmission delays that otherwise may be encountered due to accessing the system memory, or executing a necessary link layer operations. Hence, a host channel adapter maybe embedded within a processor chip in an efficient manner that shares the processor memory interface, and that minimizes required buffer capacity.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:
    storing by a transport layer module an entry in a transport layer buffer that includes a transport layer header and an identifier that specifies a stored location of a payload for the transport layer header;
    generating a transmit packet by a link layer module, including fetching the payload from the corresponding stored location based on reading the corresponding entry from the transport layer buffer, and storing the transmit packet, having the corresponding payload, in a link layer buffer configured for storing at least two transmit packets; and
    transmitting by the link layer module a stored transmit packet from the link layer buffer concurrently with the generating of the next transmit packet.

2. The method of claim 1, wherein the link layer buffer includes a first buffer portion and a second buffer portion, each configured for storing a corresponding transmit packet having a prescribed maximum transfer unit size, the storing step including storing the transmit packet, using an alternating storage sequence, in the first buffer portion based on the stored transmit packet having been stored by the link layer module in the second buffer portion.

3. The method of claim 2, wherein the host channel adapter is embedded within a processor device having a processor memory interface, the fetching step including fetching the payload from a system memory via the processor memory interface.

4. The method of claim 3, wherein the first buffer portion and the second buffer portion each have a size of four (4) kilobytes corresponding to the prescribed maximum transfer unit size being 4 kilobytes.

5. The method of claim 4, wherein the transport layer buffer has a size of about eight (8) kilobytes.

6. An embedded host channel adapter comprising:
    a transport layer buffer configured for storing a transmit packet entry including a transport layer header and an identifier that specifies a stored location of a payload for the transport layer header;
    a transport layer module configured for generating the transport layer header and storing the corresponding transmit packet entry in the transport layer buffer in response to a corresponding received work queue entry;
    a link layer buffer configured for storing at least two packets to be transmitted by the embedded host channel adapter; and
    a link layer module having payload fetch logic configured for fetching the payload via a processor memory interface based on the corresponding identifier, the link layer module configured for constructing one of the two packets to be transmitted, concurrently during transmission of the second of the two packets.

7. The embedded host channel adapter of claim 6, wherein the link layer buffer includes a first buffer portion and a second buffer portion, each configured for storing a corresponding transmit packet having a prescribed maximum transfer unit size, the link layer module having storage logic configured for storing the one of the two packets, using an alternating storage sequence, in the first buffer portion based on the second of the two packets having been stored by the storage logic in the second buffer portion.

8. The embedded host channel adapter of claim 7, wherein first buffer portion and the second buffer portion each have a size of four (4) kilobytes corresponding to the prescribed maximum transfer unit size being 4 kilobytes.

9. The embedded host channel adapter of claim 8, wherein the transport layer buffer has a size of about eight (8) kilobytes.

* * * * *